United States Patent [19]
Hoang

[11] Patent Number: 5,925,114
[45] Date of Patent: Jul. 20, 1999

[54] MODEM IMPLEMENTED IN SOFTWARE FOR OPERATION ON A GENERAL PURPOSE COMPUTER HAVING OPERATING SYSTEM WITH DIFFERENT EXECUTION PRIORITY LEVELS

[75] Inventor: Minh Hoang, Stoughton, Mass.

[73] Assignee: Motorola, Inc., Schaumburg, Ill.

[21] Appl. No.: 08/823,304

[22] Filed: Mar. 21, 1997

Related U.S. Application Data

[51] Int. Cl.[6] ............................. G06F 13/00; G06F 13/14; G06F 15/16
[52] U.S. Cl. .............................. 710/48; 712/10; 375/261; 375/265
[58] Field of Search ...................................... 395/868, 800; 375/261, 265; 710/1, 48; 712/10

[56] References Cited

U.S. PATENT DOCUMENTS

| | | | |
|---|---|---|---|
| 4,085,449 | 4/1978 | Walsh et al. | 364/900 |
| 5,170,470 | 12/1992 | Pindar et al. | 395/275 |
| 5,408,614 | 4/1995 | Thornton et al. | 395/275 |
| 5,625,828 | 4/1997 | Carmon et al. | 395/800 |

*Primary Examiner*—Thomas C. Lee
*Assistant Examiner*—Rehana Perveen
*Attorney, Agent, or Firm*—Terri S. Hughes; Hugh C. Dunlop

[57] ABSTRACT

A software implementation of a modem, particularly designed to execute on a general purpose host processor, controlled by a non-real-time, multi-tasking operating system (OS), such as the Windows 95 OS. The software modem is scaleable and portable. In this fashion, communication protocols (particularly datapumps) may be easily added to, or removed from, the system, and the modem may be easily adapted for use on other types of processors and operating systems. The controller and datapump portions execute as a plurality of interacting subsystems, each of which can execute at at least one of several priority levels. A HRT level routine is responsible for handling an ASIC that buffers transmit and receive samples destined to and received from the phone lines. A SRT level task includes logic that needs time functionality, but which is not time-critical like the HRT logic. BRT routines execute in an event-driven basis and are used for many controller functions.

14 Claims, 9 Drawing Sheets

FIG. 2B
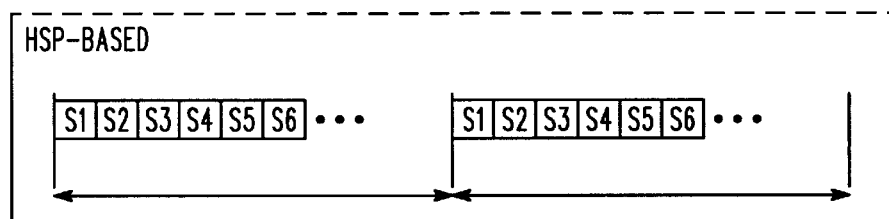
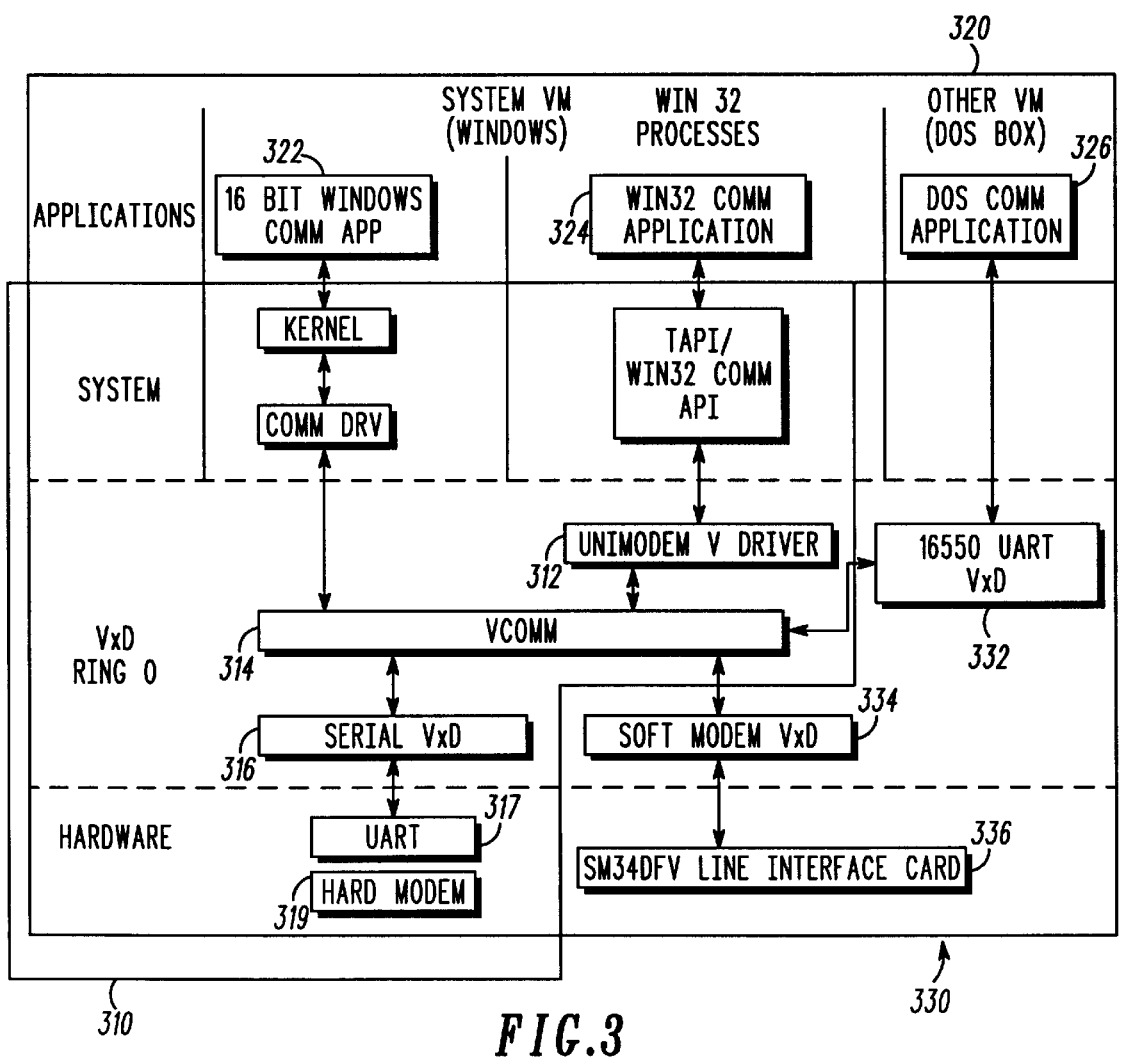
FIG. 3

MODEM IMPLEMENTED IN SOFTWARE FOR OPERATION ON A GENERAL PURPOSE COMPUTER HAVING OPERATING SYSTEM WITH DIFFERENT EXECUTION PRIORITY LEVELS

BACKGROUND

1. Field of the Invention

The invention relates to data communications and, in particular, to a software implementation of a modem that can operate on a general purpose computer having a non-real-time, multi-tasking operating environment.

2. Discussion of Related Art

Modern modems are used to connect PCs, or other data terminal equipment (DTE), into wide area communication networks, in which the telephone system is used to carry information from one PC to another. Over the years many communication standards have been developed, enabling a standards-compliant modem made by one manufacturer to communicate with a standards-compliant modem made by another manufacturer. These protocols specify various aspects of a communication protocol, such as signal constellations and coding methods to be used under the standard.

To date, modems have been typically implemented with special circuitry, or programmable digital signal processors (DSPs). Under a typical arrangement, a microprocessor and a DSP would effectively cooperate in a master-slave relationship. The microprocessor would act as a "controller," handling the control functions, such as configuring the system and the like, and the DSP would essentially act as a dedicated computation engine to handle the signal processing aspects.

The above typical arrangement would operate in a "real-time" context. That is, both the microprocessor and the DSP would be dedicated to running the modem controller and DSP software, respectively. A real-time context provides deterministic behavior, and deterministic behavior, in turn, is desirable in the modem context, because modem data streams are continuous and arrive at fixed rates.

Though the above arrangements have been well received in the marketplace, the DSP and other dedicated hardware involve component costs. Moreover, they add to the associated manufacturing, distribution and maintenance costs and affect reliability of the overall system.

BRIEF DESCRIPTION OF THE DRAWING

In the Drawing,

FIG. 2B is an interrupt model of an exemplary embodiment;

FIG. 3 is a software architectural diagram illustrating an exemplary embodiment of the invention operating in a multi-tasking, preempatble operating system;

DETAILED DESCRIPTION

The exemplary embodiments of the invention are software implementations of a modem, particularly designed to execute on a host processor, controlled by a non-real-time, multi-tasking operating system (OS), such as the Windows 95 OS. The software design of the modem is scaleable and portable. In this fashion, communication protocols (particularly datapumps) may be easily added to, or removed from, the system, and the modem may be easily adapted for use on other types of processors and operating systems.

Figure 1:
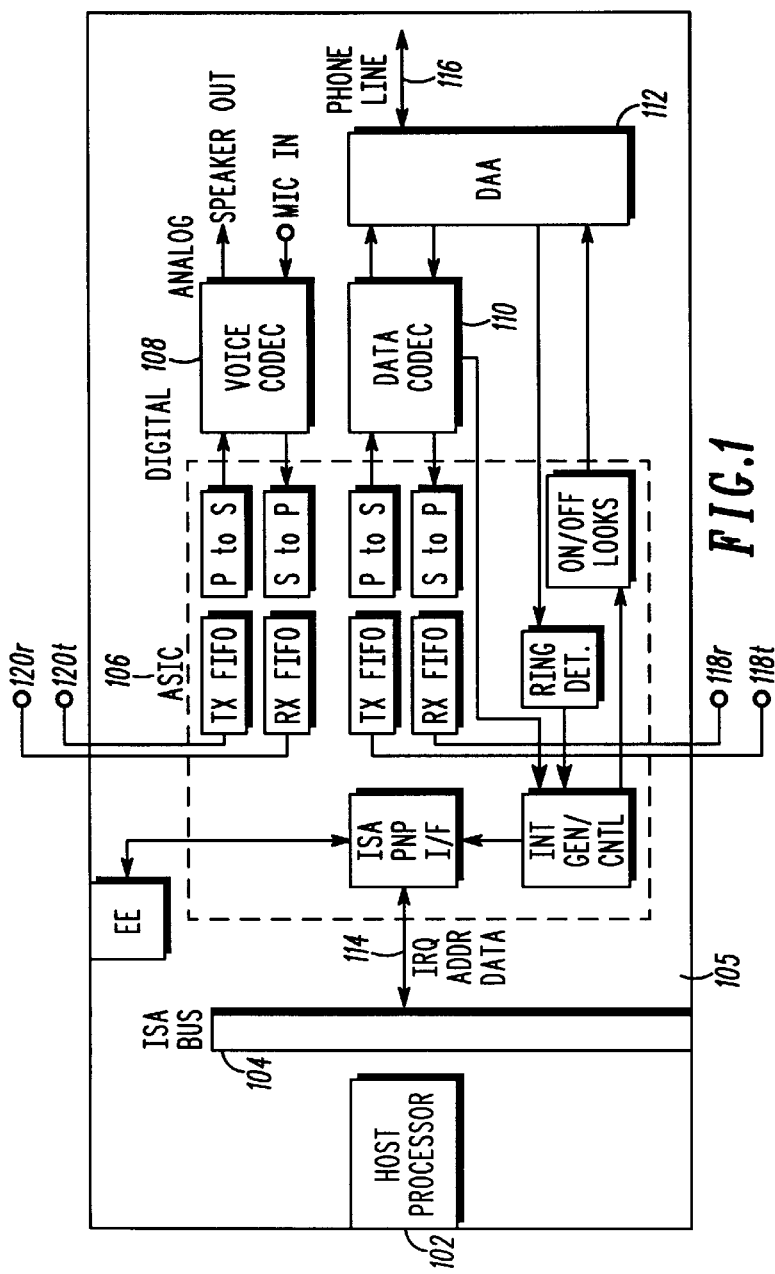
FIG. 1 is a architectural diagram of the hardware of an exemplary embodiment of the invention.

Unlike the typical modem arrangements, which have dedicated microprocessors and DSPs, the exemplary embodiments require a relatively minimal amount of hardware in addition to the host PC. FIG. 1 shows one such exemplary arrangement in the form of an ISA card. (This hardware arrangement is discussed in detail in co-pending U.S. application Ser. No. 08/607,911 to Sridhar et al., which is assigned to the assignee of this application and which is hereby incorporated by reference in its entirety.) This hardware arrangement is outlined below only to the extent necessary for understanding the exemplary embodiments of the invention.

The exemplary hardware arrangement 100 includes a host processor 102, coupled to an ISA bus 104, which is coupled to an ISA card 105. The ISA card includes an exemplary ASIC 106, which communicates on the bus 104 via IRQ/Addr/Data lines 114. The ASIC 106 is coupled to a voice codec 108 and a data codec 110, which is coupled to a data access arrangement (DAA). The voice codec 108 coupled to a microphone input and a speaker output, and the DAA is coupled to phone lines 116.

Briefly, the codecs 108, 110 perform the A/D and D/A conversions. The ASIC includes receive and transmit data FIFOs 118r and 118t, which hold, respectively, samples of data to be eventually demodulated and processed by the software modem and samples of data already modulated and processed by the software modem but which need to be converted to analog form. The ASIC 106 further includes receive and transmit voice data FIFOs 120r and 120t, which hold voice data, for example in 8 bit PCM (e.g., $\mu$-law), to be used by the host processor 102. The FIFOs' size and control thereof allow for extended interrupt latencies to the host processor 102. The actual sizes and control thereof of exemplary embodiments are discussed in the co-pending application.

Though the exemplary arrangement 100 is shown as an ISA card arrangement, skilled artisans will appreciate that the invention is applicable to other arrangements. For example, analogous logic may be implemented in alternative ASIC arrangements in which the FIFOs are implemented with memory chips external to the ASIC, or in which the codecs are implemented in the ASIC. Moreover, alternative arrangements may be implemented on the motherboard containing the host processor 102, rather than on an ISA card, and the voice codec and FIFOs are optional.

Figure 2A:
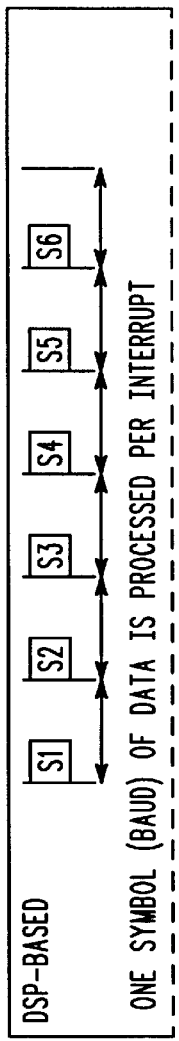
FIG. 2A is an interrupt model of traditional, prior art modems.

FIGS. 2A–B together compare the "interrupt models" of a typical DSP arrangement and of an exemplary embodiment of the software modem. FIG. 2A shows the interrupt model for a typical DSP arrangement. Under this model, one symbol (or baud) of data is processed by the modem per interrupt. This symbol of data could correspond to several samples of data, e.g., 3. FIG. 2B shows the interrupt model of an exemplary embodiment. For example, for a given hardware interrupt 90 samples (at 7.2 KHz sampling rate) may be retrieved, corresponding to 30 symbols for a data pump operating at 2400 baud and the system having a 3×sampling rate. Under this model, the ASIC 106 gathers many symbols and generates interrupts to the host PC 102 at substantially regular intervals. The software modem, executing on the host PC, will respond to the interrupts by gathering the several samples and processing them according to modem algorithms.

The buffering and interrupt model of FIG. 2B provides several advantages. First, the buffering alleviates the unpredictable nature of the interrupt latency; that is, unpredictable at least as compared to real-time contexts of traditional modems. Second, the buffering allows the host processor 102 to respond to a lower interrupt rate than that which a DSP in a real time context would respond to. In a multitasking environment a lower interrupt rate improves performance of the system by reducing the number of context switches to and from the interrupt service routine, so that not only are fewer instructions executed (i.e., the ones involved with the context switch) but cache utilization is improved.

As explained in the co-pending application, the host PC can dynamically adjust FIFO depth and the interrupt rate. In this fashion, one interrupt rate may be used for steady state operation and another may be used during certain phases of the start-up sequence where some tight timing requirements exist. For example, in steady state operation the interrupt rate is set to be about 12 to 12.5 ms and during certain start up phases the rate is set to 2.5 ms. Under this arrangement about 90 samples of data are handled for a host processor interrupt during steady state operation and about 18 samples during interrupts in the ranging phase of the V.32.

FIG. 3 shows a high-level software architectural diagram of an exemplary embodiment of the invention that is intended for the Windows 95 OS. The software components surrounded by dashed section 310 are conventional Windows OS infrastructure, including conventional infrastructure for having applications 320 communicate with a traditional modem 319 if it were connected to the system. The software applications 320 are representative of various applications that may cause communication via a modem link.

The software modem in one sense includes the components of section 330. The core of the software modem is the Soft Modem VxD 334 (host-based modem). The UART VxD 332 is a software emulation of a conventional UART and is useful in allowing DOS applications, for example, to be used in the illustrated environment. (UART emulations are commercially available.) The line interface card 336 refers to all of the hardware outlined above in its various forms.

The host-based modem 334 integrates with the OS infrastructure through the OS's VCOMM entity 314, using conventional techniques. In short, under this model, the host-based modem 334 effectively registers itself with VCOMM as a serial communications device. It is also registered with and controllable by the OS's Unimodem V entity 312 as a data/fax/voice modem, again using conventional techniques.

Any application 322, 324 wishing to communicate using the modem has its requests routed through the OS infrastructure 310 and particularly through VCOMM 314 to the appropriate entry points of the host-based modem 334. If a hardware modem 319 were used, the requests would be routed by VCOMM 314 though serial VxD 316, part of the OS infrastructure 310, to a hardware UART 317 and eventually the hardware modem 319.

Figure 4:
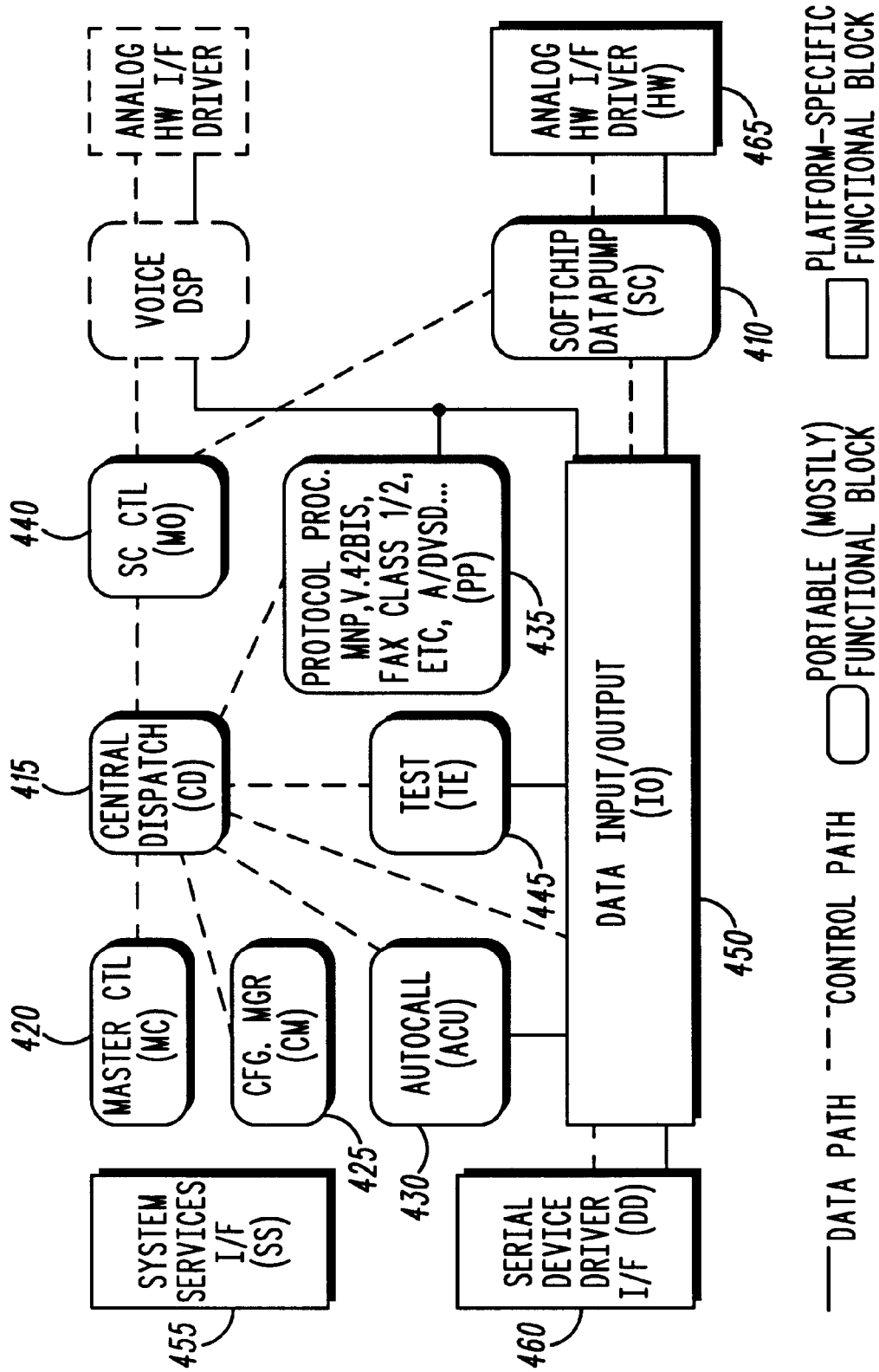
FIG. 4 is a software architectural diagram illustrating various subsystems of an exemplary embodiment of the invention.

FIG. 4 shows a more detailed software architecture 400 of an exemplary host-based modem 334. As will be explained more fully below, in context, the architecture has various subsystems. Each subsystem may have software logic executing at, or responding to software executing at, one of three levels: HRT, SRT, BRT (from highest priority to lowest). The OS recognizes other levels of priority as well, for example, for applications 320. At a given level, such as BRT, the OS will make scheduling decisions based on predefined scheduling rules. Thus, for example, under a time-sliced, round robin algorithm, an application program, which operates at a priority lower than BRT, would have a maximum amount of time in which it could use the host processor 102, before it would have to yield control. Moreover, a given level of priority, e.g., BRT could be preempted by a higher level routine, such as a HRT routine, even if the BRT routine had not yet finished.

By using multiple priority levels, the host-based modem 334 is more able to balance the competing needs of handling an effectively real-time stream of data and of economically using the host processor's resources. This may be clearer by considering a crude design. A crude design would have the entire host-based modem operate at the highest priority level. Because the logic would operate at only the highest priority level, it could not be preempted by other routines, and thus would make the environment somewhat similar to a traditional real-time environment. (Of course, the HRT routine could be blocked by another HRT routine, so the crude design and the traditional real-time design are not exact equivalents) Though operative in principal, users would likely find the crude design as undesirable, because it would likely hog the systems resources from other applications, including the ones that the user is using to cause the communication. Thus, the exemplary embodiment strikes a balance between operating on real-time data streams and using the system's resources economically.

HRT is short for Hard Real-Time and is implemented as a hardware interrupt service routine (ISR). Among other things, the HRT logic may be thought of as being responsible for handling the transmit and receive FIFOs 118, 120 (FIG. 1). Failing to keep up with the corresponding data rates for the modulation mode will have a very observable impact on the data link. Thus, the HRT routine implements portions of the SoftChip datapumps 410, in particular for the digital signal processing aspects and time-critical portions of the state machine control logic. Likewise, the HRT logic includes portions of the ASIC driver 465 and portions of the System Services 455 that are invoked at a baud-level. The HRT task is invoked as a result of interrupts from the ASIC hardware (about every 12 to 12.5 ms). How the logic is invoked is discussed below.

SRT is short for Soft Real-Time and is implemented as a global event routine, for example, in the Windows 95 OS. In an exemplary embodiment, the HRT ISR posts global events on every other triggering of the HRT ISR. Thus, since the HRT ISR operates approximately every 12.5 ms, SRT routines are triggered approximately every 25 ms. One of the subsystems, called the central dispatch (CD), among other things, keeps an SRT timer queue. When any of the various subsystems in 400 need to perform timing or monitoring operations, for example, monitoring a time out, they post references to a callback routine in the CD's SRT timer queue. The timer queue will then invoke the callback at the proper time. In this fashion, the subsystem that posted the callback may monitor elapsed time and the like, as is necessary to implement the communication standards. The actual callback routines referenced in the timer queue, of course, varies dynamically with the state of the host-based modem system 334. For example, the host-based modem may need to monitor a time-out condition at some instants in time but not at others. Callbacks may be entered in the timer queue with various switches. For example, the callback may be registered with information indicating that it should remain in the queue until cleared or until a specified time-out. Also, the callback may be registered with an indication that after a specified time, a specific event should be posted in the BRT event queue. (more below) Whereas the HRT software logic was summarized as being responsible for transmit and receive FIFOs, the SRT logic may be thought of as being responsible for the various "timer routines" typically found in a modem. For example, typical modems have various functions to measure elapsed time or to monitor, or poll, certain signals.

BRT is short for Background Real-Time and is the lowest priority level used by the host-based modem 334, but not necessarily by the overall PC system. As will be described below, the host-based modem 334 actually uses 2 separately, schedulable BRT routines. Somewhat analogously to the SRT timer queue, the central dispatch 415 includes an event queue. In this sense, whereas invocation of the callbacks in the SRT queue are time-based with a granularity of 25 ms, the invocation of BRT routines is event and message based with no time granularity. The various subsystems used in the host-based modem 334 communicate with one another via events and messages. Thus, for example, in an AT command, a data IO unit 450 may be first used in receiving the character stream and upon detecting a carriage return it would post an event to the autocall unit 430 informing it that an AT command has been received. Thus, in this sense the host-based modem at a subsystem level of description may be thought of as a large state machine in which state transitions are triggered by events. (As will be explained below, the various subsystems, in turn, have their own state) In some instances a subsystem needs to essentially go into a "sleep state," for example, a subsystem may need to wait for a response or time out. The SRT queue, therefore, includes a mechanism for posting events in such cases. Thus, if a time-out were to occur, an event would be posted to the subsystem waiting for a response or the time-out, thus waking it from its wait, or sleep, state and informing the subsystem of the time-out.

In an exemplary embodiment, SRT and BRT effectively are subpriority execution levels. The overarching execution priority level corresponds to the global event, posted by HRT. The global event is routed through system services 455 to a callback routine in CD 415 corresponding to SRT scheduling logic. The SRT scheduling logic effectively implements the subpriorities, by first processing the callbacks on the SRT timer queue. Afterwards, events on the main BRT event queue are processed, followed by the EC BRT logic. Both of the BRT groups include logic to make sure they only do limited processing and that they do not starve other routines of resources (e.g., loop counting logic). Moreover, they include logic that checks a status flag to determine whether the HRT ISR has posted another global event during their processing and, if so, they restart.

The above logic is somewhat a consequence of the exemplary embodiment operating under the Windows 95 OS. This OS has a limited number of available execution priority levels, so the exemplary embodiment implements the above-described subprioritization essentially because the OS did not provide the needed priority levels. (Other OSs having more priority levels may implement SRT and BRT at truly separate OS-implemented execution priority levels, rather than using the emulation of such as is done in the exemplary embodiment) Moreover, the use of logic to limit processing is used in the exemplary embodiment because under Windows 95 the operating system does not time-slice routines processing hardware interrupts or global events.

An alternative embodiment of the invention implements the above logic executing at BRT priority level as two separate tasks at an application level of execution priority. Though this embodiment offers the advatages of the OS-level of support of execution priority and of time-slicing the BRT routines (to avoid starving other applications) it may be susceptible to delay, when the user has a large number of concurrently running applications.

Returning to FIG. 4, some of the subsystems are considered a "common core," which is highly portable to other platforms because of its design. Other aspects are more platform-specific and consequently less portable; these other aspects are usually made platform-specific to improve performance at the expense of portability.

The common core includes SoftChip Datapump section 410, Central Dispatch (CD) 415, Master Control 420, Configuration Management 425, AutoCall Command Processing 430, Protocol Processing 435, Soft Chip Control 440, and Test 445.

The SoftChip Datapump section handles all datapump and signal processing functions, such as tone generation, call progress, call classification and the other traditional datapump and signal processing functions. These functions may depend on the corresponding standard, such as V.34, V.32 bis, etc., each of which would have a corresponding datapump that could be coupled into the architecture and each of which would be integrated into the SoftChip Datapump section 410. It also includes automode logic. (automode is known in the art)

Each datapump within the SoftChip Datapump 410 includes essentially two types of code: state machine control and digital signal processing code (not to be confused with code for DSPs). The source code is designed to be highly portable. The digital signal processing section is implemented using macros, which effectively force the compiler to compile the macros in a certain way, for example, into a particular sequence of machine instructions. (Later sections describe other aspects used to improve portability and scaleabilty) The Central Dispatch (CD) 415 manages event (BRT) and timer queues (SRT). In short, for background and timer priority levels, the main processing loop starts here and control is dispatched into an appropriate subsystem based on the state of the queues.

Master Control 420 provides higher level control functions such as connect/disconnect handling; for example, informing the various subsystems in a specified sequence about disconnects.

Configuration Management 425 maintains a configuration database analogous to that performed with conventional modem controllers. The software logic for this section is conventional, allowing for configuration of baud rates, flow control, etc., as is the case in traditional modems.

Autocall Command Processor (ACU) 430 processes commands from the terminal, analogously to conventional modem controllers. These commands may be in different known formats, such as AT, V.25 bis and LPDA.

The Protocol Processor (PP) 435 handles data mode protocols. For example, this section includes the software logic to support Error Correction/Data Compression (EC/DC) with MNP 2-5 and/or V.42 bis. This section may also support other protocols, such as for fax, cellular, or simultaneous voice transmissions. Data compression logic could include macros with platform specific optimizations. This portion includes its own separately schedulable BRT task for error correction (EC) logic, which is organized in this fashion to minimize the risk of EC logic starving the other BRT threads.

The Soft Chip Control 440 translates events into proper control settings for the Soft Chip Datapump 410. As will be described below, the SoftChip Datapump has an interface analogous to that of dedicated DSPs to improve portability and scaleability. Among other things, this allows datapumps to be written for exemplary embodiments or for DSPs. This control will translate the events posted to Soft Chip Control 440 into the appropriate register settings to initiate the datapumps into action.

Test Section 445 includes testing and diagnostic support logic.

The more platform-specific aspects of the architecture 400 include a Data IO section 450, a System Service Interface 455, a Serial Driver Interface 460, and an ASIC driver 465.

The Data IO section 450 provides lower level services for internal data transfers, for example, emulation of useful peripherals such as serial communication controllers (SCCs), e.g., asynchronous framing functions and HDLC framing.

The System Services Interface 455 insulates the above-described core from the operating system, such as the Windows 95. In this manner, the host-based modem 334 may be largely OS-independent with many of any necessary dependencies residing in the System Services Interface 455.

The ASIC driver 465 provides the software logic for interfacing with the above-described hardware. It is primarily responsible for reading data from and writing data to the ASIC FIFOs.

Figure 5:
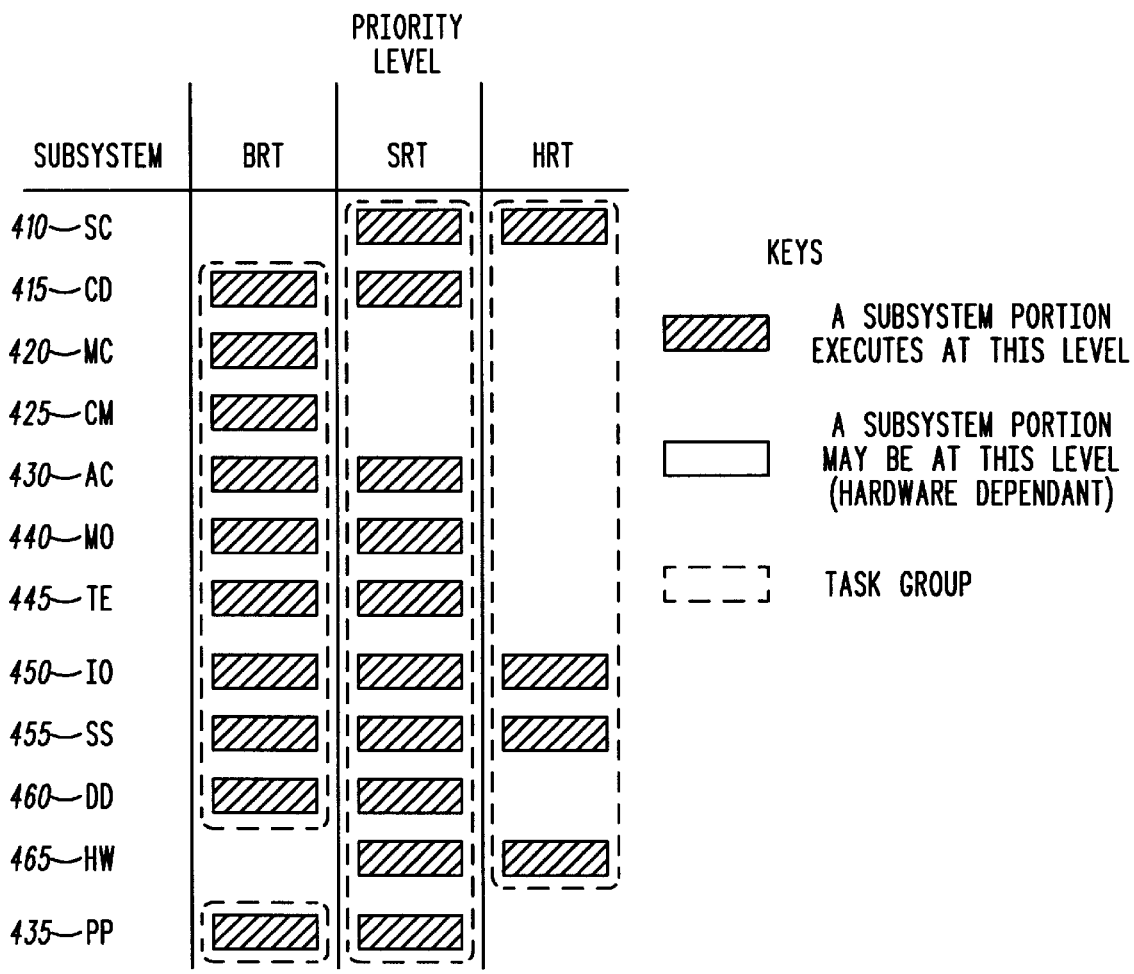
FIG. 5 illustrates the priority levels at which various subsystems operate according to an exemplary embodiment of the invention.
Figure 6:
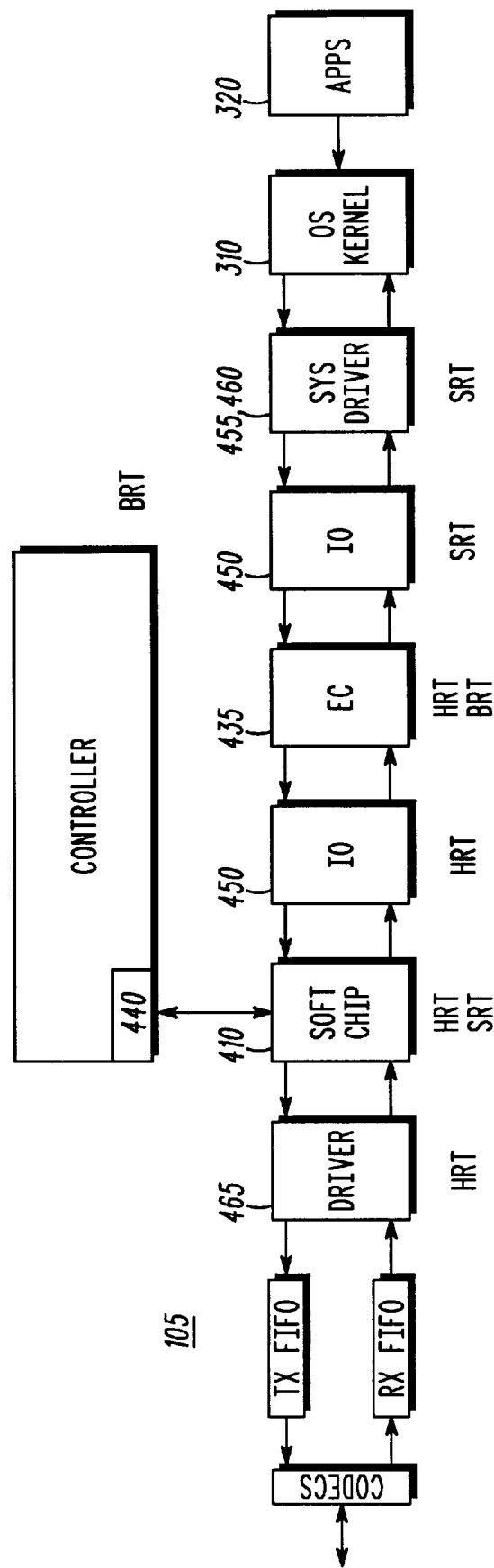
FIG. 6 illustrates priority level assignments together with subsystems of an exemplary embodiment of the invention.

FIG. 6 combines elements of FIGS. 4 and 5 so that priorities and data flow are more evident. FIG. 6 illustrates that as a general matter the closer the software logic is to the hardware, the higher the priority level the software will execute at.

FIG. 5 shows the priority assignments associated with the various subsystems, along with the task assignments. Thus, the figure shows that there are 2 BRT tasks, one for the protocol processing and particularly for the EC logic, and a second for all of the logic having invoked as a result of the BRT event queue. Likewise, the SRT task, so to speak, is the collection of callbacks registered in the CD timer queue and triggered as a result of the global event (approximately every 25 ms). The HRT task is essentially the HRT ISR, responding to ASIC 106 interrupts. (this is described in more detail below)

FIG. 6 combines elements of FIGS. 4 and 5 to illustrate that, as a general matter, the software subsystems that are on the data path operate at HRT and SRT levels, with the subsystems closer to the ASIC running at HRT, and that the entities on the control path operate at BRT.

Figure 7:
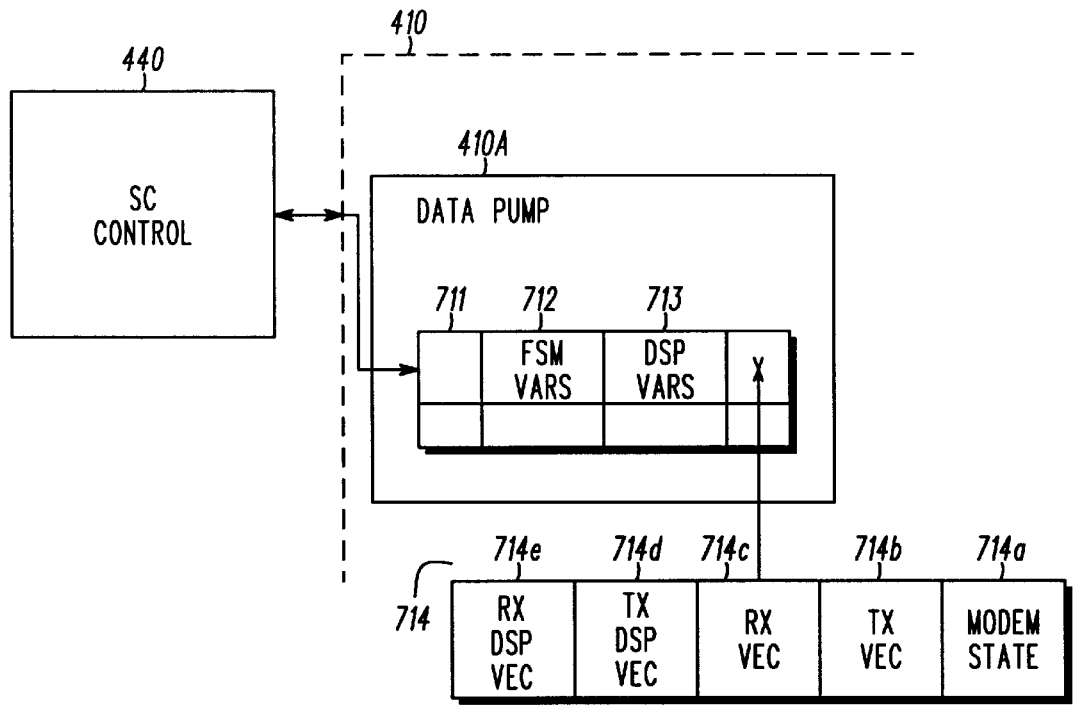
FIG. 7 shows aspects of a selected datapump of an exemplary embodiment of the invention.

FIG. 7 illustrates a portion of one datapump 410A as part of the SoftChip Datapump section 410. (The SoftChip Datapump section 410 includes datapumps for the various communication standards, e.g., V.34, V.32 bis, V.32, fax standards, etc., plus automode processing) Among other things, the datapump 410A includes a control/data structure 710. that includes an interface section 711 for interfacing with SoftChip Control section 440. This interface is modeled as a register-based interface, like interfaces used in traditional modems, but is extended in other ways, for example, for the fax-related datapumps. Finite State Machine Variables (FSM Vars) Section 712 holds data indicative of the various variables considered in determining whether a data pump state change is appropriate. DSP Vars Section 713 contains variables used by the datapump algorithms. Control Section 714 includes modem state 714a, transmit vector 714b, receive vector 714c, transmit DSP vector 714d, and receive DSP vector 714e.

The transmit DSP vector 714d and receive DSP vector 714e are pointers, respectively, transmit and receive DSP tasks. The transmit vector 714b and receive vector 714c are pointers, respectively, to transmit and receive state logic; this state logic consider the modem state and other variables in determining whether to modify the modem state 714a.

When the ASIC 106 generates an interrupt, the HRT ISR is eventually invoked. Typically, the latency is small between the generation of the interrupt and the time the ISR is invoked, but the time can vary and become large if another ISR is executing at the time the interrupt is received, thus blocking the HRT ISR from execution.

Figure 8:
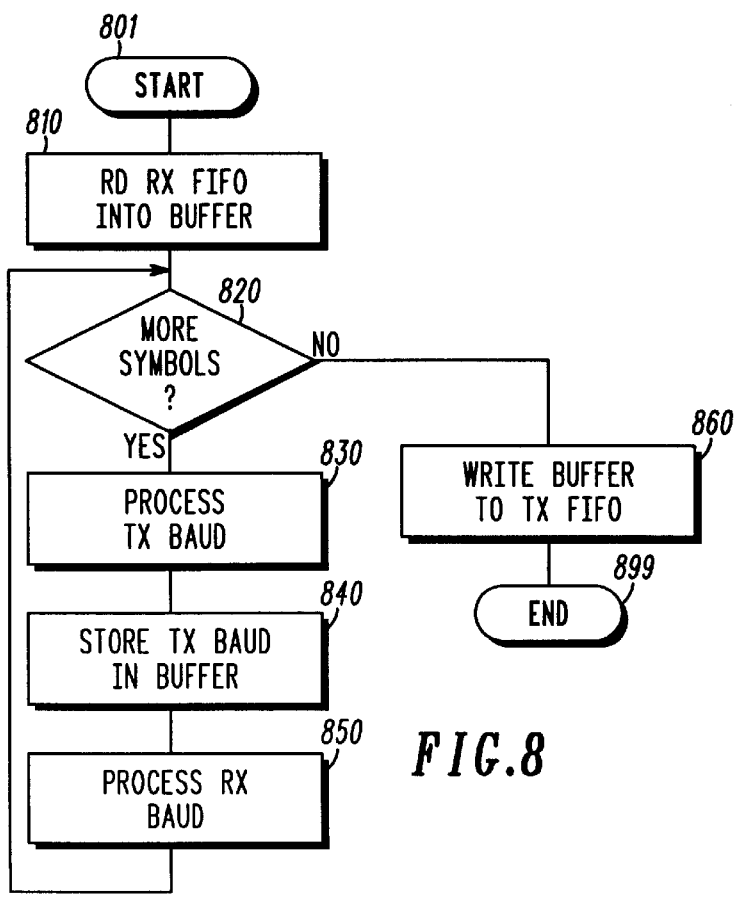
FIG. 8 shows the logic of the HRT interrupt service routine of an exemplary embodiment of the invention.

Referring to FIG. 8, the HRT routine starts at step 801 and proceeds to step 810. In step 810, the HRT routine reads the samples from the RX FIFO 118r of the ASIC 106. The number of samples depends on various things such as the sampling rate of the codecs and the programmed interrupt rate for the ASIC 106. In an exemplary embodiment, 90 samples of data would be read.

The logic proceeds to step 820 where it is determined whether more bauds, or symbols, need to be processed. For example, if 3×sampling were used, the 90 samples would correspond to 30 bauds. The amount of baud to be processed depends on the datapumps involved, as well as the sampling and baud rates.

Figure 11:
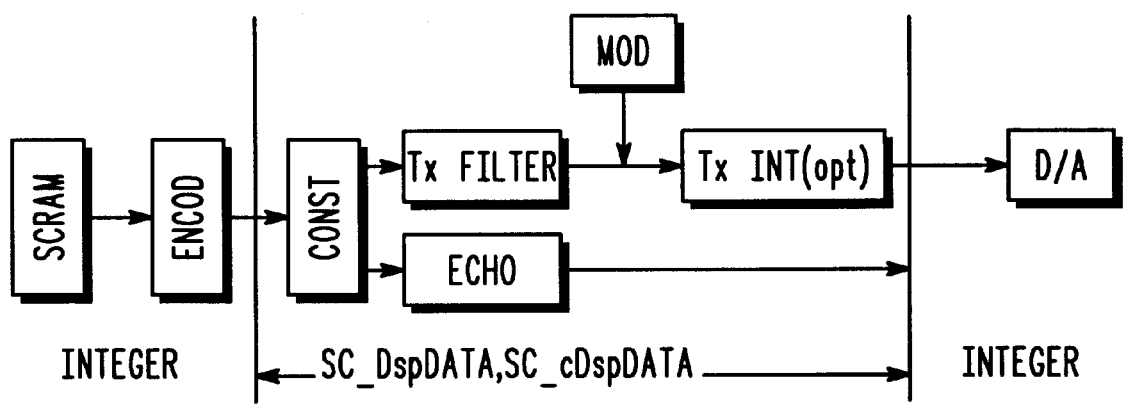
FIG. 11 shows a block diagram of a transmit portion of a datapump of an exemplary embodiment of the invention.

If more bauds are to be processed, the logic proceeds to step 830, where a transmit baud is processed. This step 830 involves accessing the state control logic pointed to by txvec 714b in the data/control structure 714b for the selected datapump 410a. The state control logic pointed by txvec 714b will look at the modem state 714a and the various variables in the control structure 710 and update the modem state accordingly, all corresponding to the datapump's specific algorithms. After updating the modem state, step 830 then processes the samples (e.g., 3) corresponding to the next baud to be transmitted. This is done by referencing the software logic pointed to by txdspvec 714d in control structure 710. Txdspvec points to logic like that found in FIG. 9, which is fairly representative for most datapumps 410a. The various routines invoked correspond to a typical transmitter structure, such as the block diagram structure of FIG. 11. In this instance, however, the logic implementing the transmitter functions executes on the host processor, not on a dedicated DSP. For example FIG. 11 shows data types below the components as they are used in the host-based modem 334, not traditional DSP datapumps. The data types SC-DspDATA and SC_cDspDATA are genericized data types. Integer is a common data type for integer numerical values. (The genericized data types may be implemented with platform-specific macros, for example, exploiting floating point capabilities if it is provided by the host processor 102 or a co-processor (not shown)).

After processing the transmit baud, it stores the samples (e.g., 3) in a buffer in step 840. The logic then proceeds to step 850.

Figure 9:
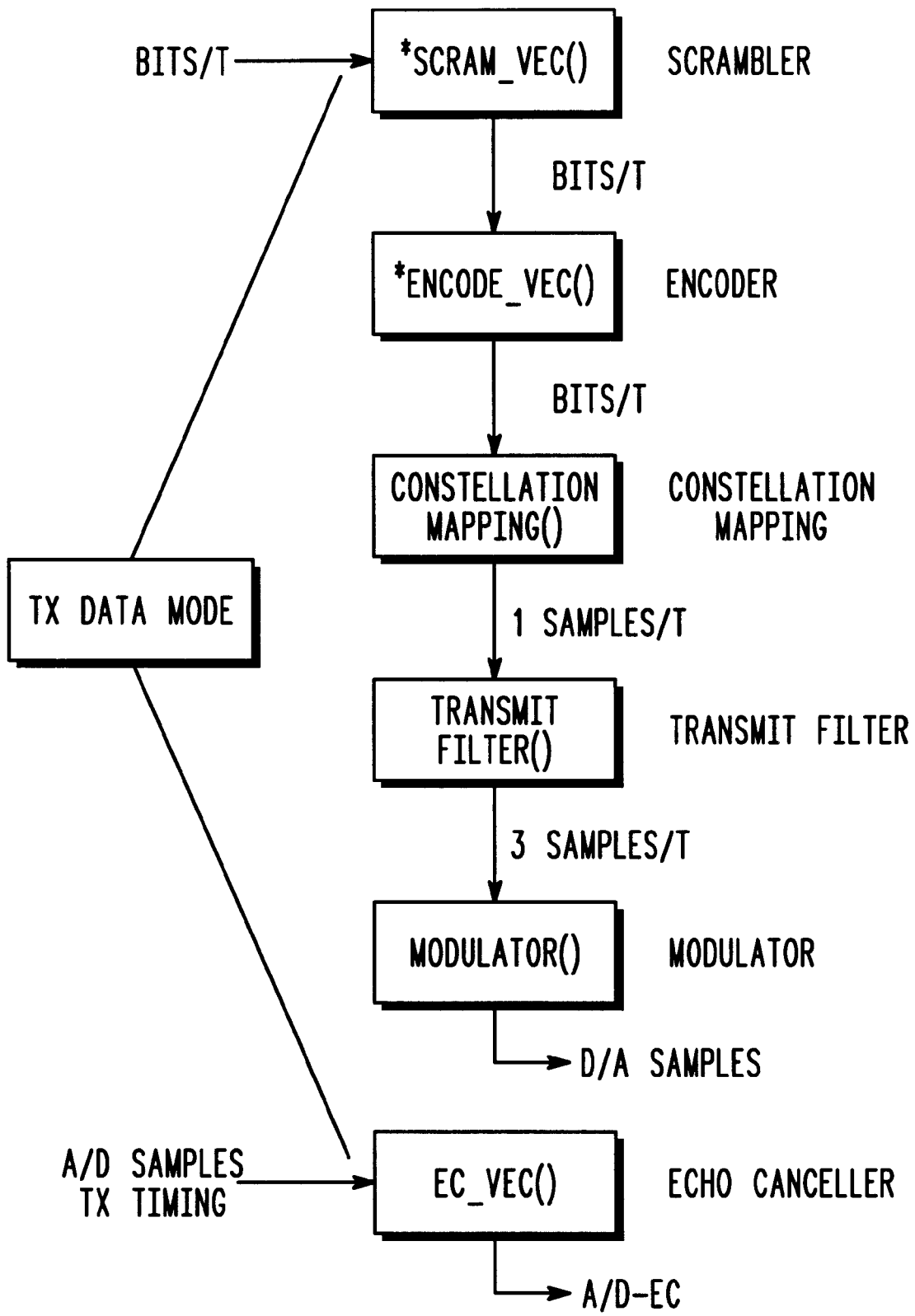
FIG. 9 shows the logic of a transmit portion of a datapump of an exemplary embodiment of the invention.
Figure 10:
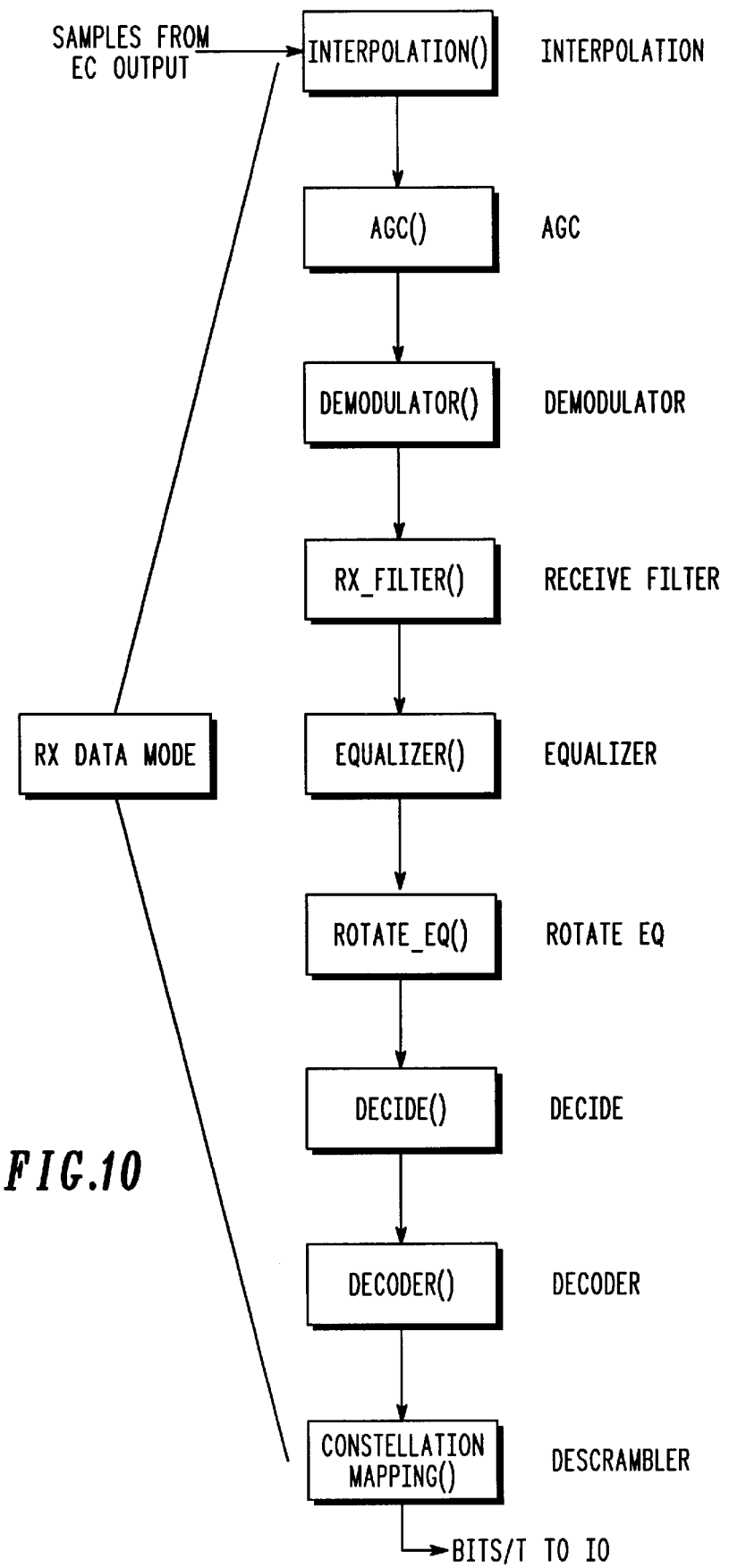
FIG. 10 shows the logic of a receive portion of a datapump of an exemplary embodiment of the invention.

In step 850, the HRT routine then processes a receive baud. This is somewhat analogous to the processing of the transmit baud. For example, 3 samples of data which were read back in step 810 along with all of the other samples are processed at a time, corresponding to one receive baud. As part of the processing, the HRT routine invokes the logic pointed to by rxdspvec 714e in control structure 710 of the selected data pump 410a. The logic pointed to by 714e is represented in FIG. 10, which like the case in FIG. 9, is fairly representative of typical receiver structures. Again, like the case in FIG. 9, the actual algorithms implemented by the logic routines of FIG. 10 are datapump specific and are implemented in the host processor 102, not a dedicated DSP. After performing the digital signal processing operations, the state control logic for the receiver is updated by invoking the logic pointed to by rxvec 714c, which looks at the modem state and the variables in the control structure 710 and modifies the state 714a accordingly.

After processing the receive baud, the logic loops back to step 820, where it determines whether more baud need to be processed. If not, the logic proceeds to step 860.

In step 860, the data samples stored in the several iterations of step 840 are written to the transmit FIFO 118t of the ASIC 106.

The logic then ends in step 899, but is invoked again for the next ASIC interrupt (again, about every 12–12.5 ms).

The state control logic 714b,c and the dsp logic 714d,e referred to above reside in the datapump 410a. Likewise, the variables 712, 713 used in determining whether more baud need to be processed are also indirectly referenced from the control structure 710. Thus, the HRT routine may be made datapump independent by referencing the various logic, residing in the datapumps, rather than hardcoding the logic into the HRT image.

Sending information to the datapump and retrieving information from the datapump is accomplished via the datapump's 410a registered-based interface. This is controlled via the SoftChip control subsystem 440.

The operation of the modem is summarized as follows. At startup, the host-based modem 334 is registered with the OS 310 using conventional techniques. The central dispatch (CD) 415 is initialized, as are the various other sections of the modem by invoking init routines for each section. As part of the init routine, each subsystem will post necessary callbacks with the SRT and BRT queues as necessary. The ASIC 106 is initialized, which will, among other things, cause the ASIC to start initiating hardware interrupts to the host-processor 102 about every 12 to 12.5 ms in steady-state.

Steady state operation is then initiated with master control causing the two BRT level tasks to start. The main task transfers events and messages as necessary. The EC task operates when necessary. It is envisioned that in some system states an EC operation may actually take more than one BRT time quanta.

The modem 334 is then configured using the CM 425 and a default set of values kept in a device control block associated with the host-based modem 334. This includes setting the various modem parameters typically configured in a traditional modem and using conventional techniques.

The system then operates in an essentially event-driven and interrupt-driven manner, the exact behavior of which depends on the actual commands provided to the modem and the actual data streams encountered. The control logic of ACU 430, Master Control 420, and Protocol Processing 435 is analogous to logic used in modern modems, but improved to the event-driven and interrupt-driven structure described above. The CD 415 and Soft Chip Control 440 are described above. The various datapumps and automode logic in Datapump section 410 use DSP algorithms akin to those used in typical DSPs, but potentially modified for the general purpose host microprocessor 102. As stated above, the digital signal processing algorithms are implemented with macros for genericized DSP functions and data types. An exemplary embodiment uses datapumps for V.34, V.32 bis, V.32, V.22 bis and fax, but is easily extended to others because of the well defined interfaces.

To make the system portable, certain conventions are followed. As much of the design as practical is implemented in a high-level language such as 'C'. Moreover, platform-specific algorithms are avoided as much as possible; for example, assumptions relying on big/little endian arrangements for numerical values. (Sometime platform-specific algorithms are necessary for performance reasons, but these should be collected in a platform-specific library). Constants and variables are separated where possible to assist in implementation with ROM/RAM based designs. The code does not rely on direct reference to variables, and instead assumes the OS may use dynamic data space allocation. Use modular design techniques.

Each of the datapumps in the SoftChip Datapump sections 410, unlike traditional modems, is designed to be executed on a general purpose microprocessor. Generally speaking, the instruction set available for the digital signal processing algorithms will not include the hardware do-loops, fractional arithmetic, modulo addressing and other functions typically available with DSPs. To combat this, the various datapumps are designed with source code that will use macros for the conventional DSP instructions. More particularly, a set of defined and generic DSP data types and macros are created that are used by the datapumps code. When compiled, these will become sequences of instructions for the general purpose processor of the host PC 102, not special-purpose DSP instructions and data types. Each of the macros is likely to be platform dependent. Thus, while the original source code will not need to change much for various platforms, the macro libraries will. The macros, for example, may take advantage of floating point capabilities if they're provided by the target processor.

The present invention may be embodied in other specific forms without departing from the spirit or essential characteristics. The described embodiments are to be considered in all respects only as illustrative and not restrictive.

What is claimed is:

1. A multi-modulation mode modem for operation with a general purpose processor, operating under the control of a multi-tasking operating system, a memory coupled to the general purpose processor, and a buffering device that is capable of holding a plurality of transmit and receive samples, destined for and received from, a wide area link, the operating system including at least two execution priority levels, used in scheduling decisions of the operating system, the modem comprising:

a first set of general purpose processor-executable instructions executable by the general purpose processor, in a processor-readable medium, responsive to interrupts from the buffering device and operating at a first execution priority level in the operating system, the first set of instructions including instructions for causing the buffering device to provide to the general purpose processor the receive samples received from the wide area link;

instructions for causing the received samples to be processed according to datapump-receive instructions, the datapump-receive instructions corresponding to one of the multiple modulation modes;

instructions for receiving information, routed through the operating system to the modem, and for causing the information to be processed according to datapump-transmit instructions, the datapump-transmit instructions corresponding to one of the multiple modulation modes, the datapump-transmit instructions providing transmit samples;

instructions for causing the transmit samples to be provided to the buffering device, from which the transmit samples may be transmitted on the wide area link, under the control of the buffering device;

a second set of general purpose processor-executable instructions executable by the general purpose processor, in a processor-readable medium, responsive to global events occurring at a substantially regular rate and operating at a second execution priority level in the operating system relatively lower than the first execution priority level of the first set of instructions, the second set of instructions including modem controller functions for receiving commands, routed through the operating system to the modem, and for responding thereto by controlling the modem according to a pre-specified set of modem operations.

2. A multi-modulation mode modem for operation with a general purpose processor, operating under the control of a multi-tasking operating system, a memory coupled to the general purpose processor, and a buffering device that is capable of holding a plurality of transmit and receive samples, destined for and received from, a wide area link, the operating system including at least two execution priority levels, used in scheduling decisions of the operating system, the modem comprising:

a first set of general purpose processor-executable instructions, in a processor-readable medium, responsive to interrupts from the buffering device and operating at a first execution priority level, the first set of instructions including instructions for causing the buffering device to provide to the general purpose processor the receive samples received from the wide area link:

instructions for causing the received samples to be processed according to datapump-receive instructions, the datapump-receive instructions corresponding to one of the multiple modulation modes;

instructions for receiving information, routed through the operating system to the modem, and for causing the information to be processed according to datapump-transmit instructions, the datapump-transmit instructions corresponding to one of the multiple modulation modes, the datapump-transmit instructions providing transmit samples;

instructions for causing the transmit samples to be provided to the buffering device, from which the transmit samples may be transmitted on the wide area link, under the control of the buffering device;

and the modem comprising:

a second set of general purpose processor-executable instructions, in a processor-readable medium, responsive to global events occurring at a substantially regular rate and operating at a second execution priority level relatively lower than the first execution priority level of the first set of instructions, the second set of instructions including modem controller functions for receiving commands, routed through the operating system to the modem, and for responding thereto by controlling the modem according to a pre-specified set of modem operations, and controller functions comprising a first subset of controller instructions that operate at a second execution priority level used by the modem relatively lower than the first execution priority level, the first subset including control dispatching instructions for maintaining a timer-based queue and an event-based queue, wherein a plurality of instruction routines may be referenced to the timer-based queue and the event-based queue, the control dispatch instructions including instructions for determining when instruction routines referenced to the timer-based queue should be invoked and including instructions for invoking routines on the event-based queue, wherein at least a portion of the pre-specified set of modem operations is implemented in the first subset of controller functions, and wherein the portion includes instructions for referencing controller routines to the timer-based queue and the event queue; and a second subset of controller instructions that operate at a third execution priority level used by the modem intermediate the first and second execution priority levels, the second set of instructions comprising the controller routines referenced to the timerbased queue by at least the first subset of the second set of controller instructions, wherein the second execution priority level and the third execution priority level are implemented as subpriority levels of an execution priority level of the operating system.

3. The modem of claim 1 wherein the first set of general purpose processor-executable instructions includes a driver routine for responding to interrupts from the buffering device, the driver routine including a set of instructions for indirectly referencing a set of instructions forming a datapump of one of the multiple modulation modes and also including a set of instructions for indirectly referencing a set of instructions for maintaining a state description of the datapump, wherein the datapump is responsive to the state description.

4. A multi-modulation mode modem for operation with a general purpose processor, operating under the control of a multi-tasking operating system, a memory coupled to the general purpose processor, and a buffering device that is capable of holding a plurality of transmit and receive samples, destined for and received from, a wide area link, the operating system including at least two execution priority levels, used in scheduling decisions of the operating system, the modem comprising:

a first set of general purpose processor-executable instructions, in a processor-readable medium, responsive to interrupts from the buffering device and operating at a first execution priority level in the operating system, the first set of instructions including instructions for causing the buffering device to provide to the general purpose processor the receive samples received from the wide area link;

instructions for causing the received samples to be processed according to datapump-receive instructions, the datapump-receive instructions corresponding to one of the multiple modulation modes;

instructions for receiving information, routed through the operating system to the modem, and for causing the information to be processed according to datapump-transmit instructions, the datapump-transmit instructions corresponding to one of the multiple modulation modes, the datapump-transmit instructions providing transmit samples;

instructions for causing the transmit samples to be provided to the buffering device, from which the transmit samples may be transmitted on the wide area link, under the control of the buffering device; and a second set of general purpose processor-executable instructions, in a processor-readable medium, responsive to global events occurring at a substantially regular rate and operating at a second execution priority level in the operating system relatively lower than the first execution priority level of the first set of instructions, the second set of instructions including modem controller functions for receiving commands, routed through the operating system to the modem, and for responding thereto by controlling the modem according to a pre-specified set of modem operations, wherein the second set of instructions includes a first subset of controller instructions that operate at the second execution priority level used by the modem, the first subset including control dispatching instructions.

5. The modem of claim 4, wherein the control dispatching instructions maintain a timer-based queue and an event-based queue.

6. The modem of claim 5, wherein a plurality of instruction routines may be referenced to the timer-based queue and the event-based queue.

7. The modem of claim 6, wherein the control dispatch instructions include instructions for determining when instruction routines referenced to the timer-based queue should be invoked.

8. The modem of claim 7, wherein the control dispatch instructions further include instructions for invoking routines on the event-based queue.

9. The modem of claim 8, wherein at least a portion of the pre-specified set of modem operations is implemented in the first subset of controller functions, and wherein the portion includes instructions for referencing controller routines to the timer-based queue and the event queue.

10. The modem of claim 9, further comprising:

a second subset of controller instructions that operate at a third execution priority level used by the modem intermediate the first and second execution priority levels, the second set of instructions comprising the controller routines referenced to the timerbased queue by the first subset of the second set of controller instructions.

11. The modem of claim 10, wherein the second execution priority level and the third execution priority level are implemented as subpriority levels of an execution priority level of the operating system.

12. A multi-modulation mode modem comprising:

a single general purpose processor;

a multi-tasking operating system controlling the general purpose processor, the operating system including at least two execution priority levels used in scheduling decisions of the operating system; and a processor-readable medium having stored therein:

a first set of general purpose processor-executable instructions executable by the general purpose processor, operating at a first execution priority level in the operating system, the first set of instructions including instructions for causing samples received by the general purpose processor from a wide area link via a buffering device to be routed through the operating system and to be processed according to datapump-receive instructions, and instructions for causing transmit information to be processed by the general purpose processor according to datapump-transmit instructions, to provide transmit samples to the buffering device;

a second set of general purpose processor-executable instructions executable by the general purpose processor, operating at a second execution priority level of the operating system relatively lower than the first execution priority level of the first set of instructions, the second set of instructions including modem controller functions for receiving commands, routed through the operating system to the modem, and for responding thereto by controlling the modem according to a pre-specified set of modem operations; and a first subset of the second set of controller instructions that operates at a third execution priority level in the operating system, the second set of instructions comprising controller routines referenced to a timerbased queue by at least the first subset of controller instructions.

13. An article of manufacture comprising a processor-readable medium having stored therein:

a first set of general purpose processor-executable instructions which, when loaded into a single general purpose processor having an operating system having at least two execution priority levels used in scheduling decisions of the operating system, cause the single general purpose processor to implement a modem by performing tasks at a first execution priority level in the operating system, which tasks include causing samples received by the general purpose processor from a wide area link via a buffering device to be routed through the operating system and to be processed according to datapump-receive instructions, and causing transmit information to be processed by the general purpose processor according to datapump-transmit instructions, to provide transmit samples to the buffering device;

a second set of general purpose processor-executable instructions which, when loaded into the same general purpose processor, cause the single general purpose processor to perform tasks at a second execution level in the operating system relatively lower than the first execution priority level, which tasks include receiving commands, routed through the operating system modem, and responding thereto by controlling the general purpose processor according to a pre-specified set of modem operations; and a first subset of the second set of controller instructions that operate at a third execution priority level in the operating system, the second set of instructions comprising controller routines referenced to a timerbased queue by at least the first subset of the second set controller instructions.

14. A method of operation of a single general purpose processor having a multi-tasking operating system controlling the general purpose processor, the operating system including at least two execution priority levels used in scheduling decisions of the operating system, to implement a modem, the method comprising, in the general purpose processor:

at a first execution priority level in the operating system, causing samples received by the general purpose processor from a wide area link via a buffering device to be routed through the operating system and to be processed according to datapump-receive instructions, and processing transmit information according to datapump-transmit instructions, to provide transmit samples to the buffering device;

at a second execution priority level in the operating system relatively lower than the first execution priority level of the first set of instructions, receiving commands, routed through the operating system, and responding thereto by controlling the general purpose processor according to a pre-specified set of modem operations and at a third execution priority level in the operating system intermediate the first and second execution priority levels, executing controller routines referred to a timerbased queue at least by instructions executing at the second execution priority level.

* * * * *